(12) United States Patent
Whitted

(10) Patent No.: US 6,803,858 B2
(45) Date of Patent: Oct. 12, 2004

(54) BLIND SPOT ALERT SYSTEM

(76) Inventor: Sandra Whitted, 16413 Turner, Markham, IL (US) 60426

( * ) Notice: Subject to any disclaimer, the term of this patent is extended or adjusted under 35 U.S.C. 154(b) by 101 days.

(21) Appl. No.: 10/134,808

(22) Filed: Apr. 29, 2002

(65) Prior Publication Data

US 2003/0201877 A1 Oct. 30, 2003

(51) Int. Cl.$^7$ .................................................. G08G 1/16
(52) U.S. Cl. ........................ 340/903; 340/435; 340/555; 340/989; 180/167; 180/169
(58) Field of Search ................................ 340/435, 432, 340/555, 901, 902, 903, 904, 425.5, 438, 905, 933, 988, 989; 180/167, 169

(56) References Cited

U.S. PATENT DOCUMENTS

| | | | |
|---|---|---|---|
| 2,771,594 A | 11/1956 | Gourdou | |
| 3,192,437 A | 6/1965 | Meyer | |
| 3,601,792 A | 8/1971 | Murray | |
| 4,117,457 A | * 9/1978 | Latta | 340/432 |
| 4,260,980 A | * 4/1981 | Bates | 340/904 |
| 4,290,047 A | * 9/1981 | Latta, Jr. | 340/435 |
| 4,456,903 A | * 6/1984 | Kishi et al. | 340/531 |
| 4,694,295 A | * 9/1987 | Miller et al. | 340/903 |
| 4,825,211 A | * 4/1989 | Park | 340/901 |
| 4,912,454 A | * 3/1990 | Solow | 340/472 |
| 5,005,004 A | * 4/1991 | Udofot | 340/600 |
| 5,583,495 A | 12/1996 | Ben Lulu | |
| 5,654,891 A | 8/1997 | Naccache et al. | |
| 6,040,774 A | 3/2000 | Schepps | |
| 6,201,236 B1 | 3/2001 | Juds | |
| 6,243,024 B1 | 6/2001 | Yamabuchi et al. | |
| 6,281,786 B1 | 8/2001 | Adachi et al. | |
| 6,281,806 B1 | 8/2001 | Smith et al. | |

* cited by examiner

Primary Examiner—Jeffery Hofsass
Assistant Examiner—Daniel Previl
(74) Attorney, Agent, or Firm—Michael R. McKenna

(57) ABSTRACT

A vehicle alert system (100) alerts a driver of a vehicle about objects within a predetermined distance from the vehicle. The vehicle alert system (100) has at least two sensors (102) that detect objects within a predetermined distance of the sensor using light and changes in light. When an object is detected near the vehicle, an amplifier (104) activates an alarm circuit (107) to alert the driver that the blind spot is obstructed.

5 Claims, 1 Drawing Sheet

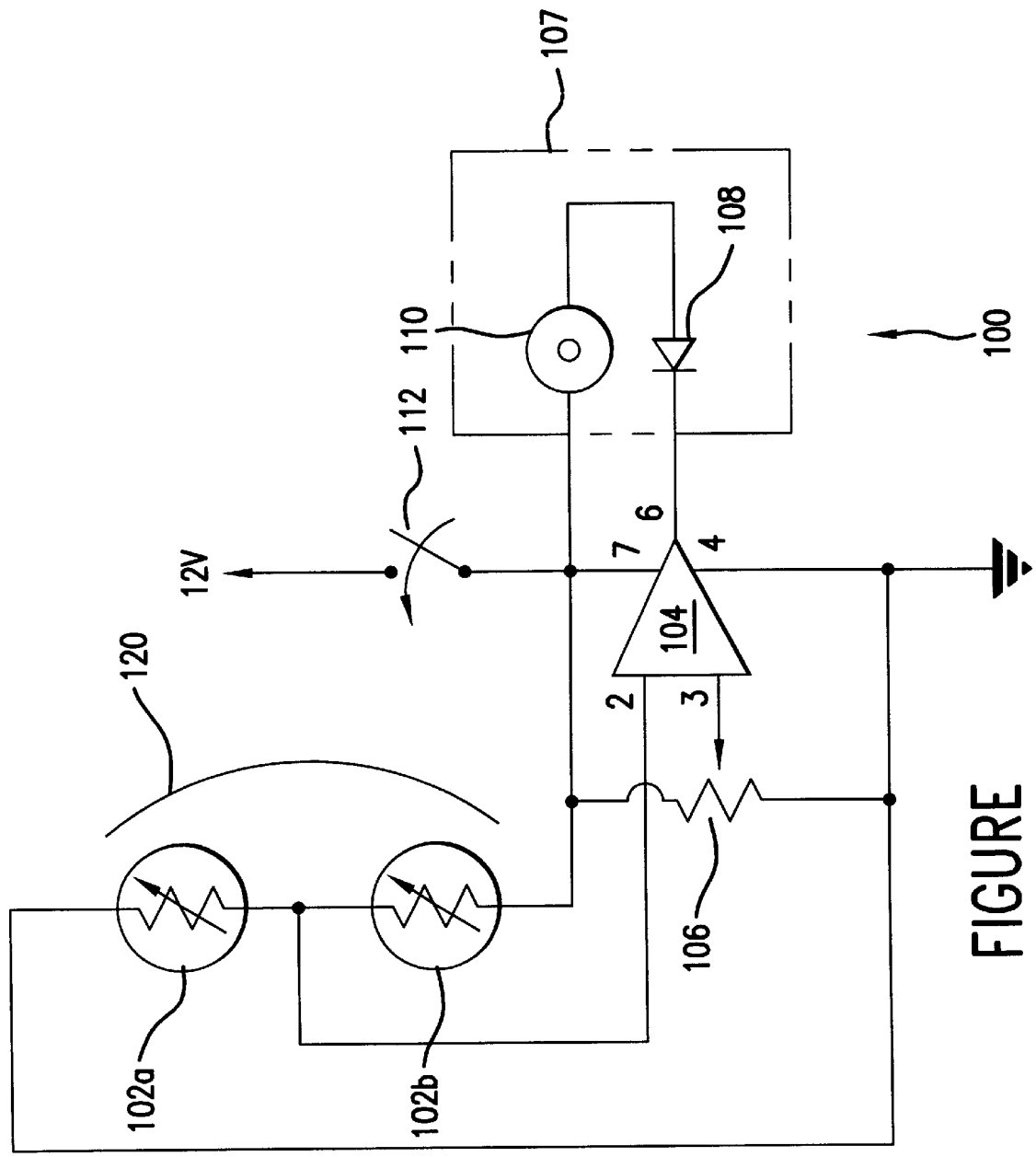
FIGURE

BLIND SPOT ALERT SYSTEM

FIELD OF THE INVENTION

The present invention relates generally to blind spot detection systems, and in particular, to a vehicle alert system that alerts a driver of a vehicle about objects that are within a predetermined distance from the vehicle.

BACKGROUND OF THE INVENTION

While driving a vehicle, it is commonplace for a driver of the vehicle to change lanes in order to pass another vehicle, to get into a turning lane, etcetera. Prior to changing lanes, after checking the rear and side view mirrors, the driver typically looks over his or her shoulder to determine whether there is another vehicle in a blind spot that would deter the driver from immediately moving into a new lane. However, some drivers do not sufficiently check the blind spot for approaching vehicles, even when they look over their shoulders prior to changing lanes. And, as a result, these drivers put themselves and others at risk of danger when they attempt to move into a new lane with another vehicle that is on the immediate side of their vehicle.

Presently, there are a number of blind spot detection systems that detect objects within a blind spot of a vehicle. For example, U.S. Pat. No. 6,243,024 (Yamabuchi) is a device for monitoring surroundings of vehicles using electromagnetic waves; U.S. Pat. No. 6,201,236 (Juds) is a detection system with improved noise tolerance; U.S. Pat. No. 4,694,295 (Miller) is a vehicle blind spot detector that displays a distance between a vehicle and a threat obstacle to a driver of a vehicle based on a frequency of a signal; U.S. Pat. No. 5,583,495 (Ben Lulu) is a vehicle alert system using ultrasound; and U.S. Pat. No. 4,260,980 (Bates) is a blind spot detector for vehicles that allows a driver of the protected vehicle to use a knob to adjust the sensitivity of the system to a desired distance. However, with all of these detection systems, there still remains a great likelihood of false detections of objects that are outside the high-risk area. Also, many of these systems are complex and expensive.

Therefore, a need exists for a simple method and system that detects objects within a predetermined distance from the vehicle for alerting a driver of the vehicle of true danger.

SUMMARY OF THE INVENTION

A vehicle alert system alerts a driver of a vehicle when an object is in a blind spot of the vehicle in accordance with the present invention. Preferably, the vehicle alert system is activated when a driver of the vehicle turns on the turn signal in the vehicle. Alternatively, the alert system remains active during the operation of the vehicle. When an object approaches a section of the vehicle that is protected by the system, then an alarm is generated to alert the driver about the object. Preferably, the alert system includes photoresistors for determining whether an object is within a predetermined distance from the vehicle. The photoresistors are coupled to an input of an operational amplifier. The output of the operational amplifier is coupled to an audible and visual alarm. In response to detection of an object a predetermined distance from the vehicle, that is, in the vehicle's blind spot, an alarm is activated. The audible alarm is preferably a buzzer and the visual alarm is preferably a light emitting diode (LED).

BRIEF DESCRIPTION OF THE DRAWINGS

The FIGURE is a block diagram of an alert system in accordance with the present invention.

DETAILED DESCRIPTION OF THE PREFERRED EMBODIMENTS

The FIGURE is a block diagram of a vehicle alert system 100 in accordance with a preferred embodiment of the present invention. Vehicle alert system 100 includes a first sensor 102a, a second sensor 102b, an operational amplifier 104, a variable resistor 106, an alarm circuit 107, and a switch 112. Vehicle alert system 100 is preferably mounted on a vehicle in an area near the rear corners of the vehicle such that a fresnel lens 120 shields the first sensor 102a and the second sensor 102b. Most preferably, one vehicle alert system 100 is mounted in a rear area of the vehicle where the turn signal indication lights are located and another vehicle alert system 100 is mounted in the opposite rear corner of the vehicle in the area where the turn signal indication lights are located. Also, vehicle alert systems 100 may be mounted in the front corners of the vehicle in areas where the turn signal indication lights are located.

First sensor 102a and second sensor 102b are coupled to an input of operational amplifier 104. Another input of operational amplifier 104 is preferably connected to variable resistor 106. The first sensor 102a and second sensor 102b, in combination with the variable resistor 106, determine an output of operational amplifier 104. More specifically, in accordance with the present invention, the first sensor 102a and second sensor 102b cause operational amplifier 104 to activate alarm circuit 107 when first sensor 102a and second sensor 102b sense an object within a predetermined distance of the sensors.

The vehicle alert system 100 is alternatively always powered on when the vehicle is operational or is preferably powered by a switch 112 that is activated when a turn signal is activated on the vehicle.

First sensor 102a and second sensor 102b are preferably photoresistors that produce a current or conduct electricity in response to changes in light. The photoresistors are chosen such that the changes in light are detected for a predetermined distance surrounding the sensors, and hence the vehicle. Most preferably, first sensor 102a is connected to a power supply voltage, in the FIGURE, ground; and second sensor 102b is connected to first sensor 102a and another power supply voltage, in the FIGURE, a 12-volt power source. The node intermediate the first sensor 102a and second sensor 102b is connected to an input of operational amplifier 104.

A variable resistor 106 is connected to an input of operational amplifier 104. Variable resistor 106 preferably allows adjustment of the sensitivity of vehicle alert system 100. The variable resistor is alternatively replaced with a resistor of a predetermined value.

Operational amplifier 104 is any suitable operational amplifier, such as a 741 model op amp. Alternatively, operational amplifier 104 is a more complex circuit, such as a microprocessor with interface circuits, that performs at least the desired function described herein.

Alarm circuit 107 is preferably activated by an output of operational amplifier 104. More specifically, the inputs of operational amplifier 104 determine an output of operational amplifier 104. This output preferably sources or sinks a current to the alarm circuit 107 to produce an audible and visual alarm. In the preferred embodiment, alarm circuit 107 includes a light emitting diode 108 and a buzzer 110. As shown in the FIGURE, buzzer 110 is coupled to a first power supply voltage and to light emitting diode 108. Light emit ting diode 108 is coupled to the output of the operational amplifier. Buzzer 110 provides an audible alarm and light-emitting diode 108 provides a visual alarm. Preferably, buzzer 110 and diode 108 are mounted in an interior of the vehicle in a manner to make them perceptible to a driver of the vehicle.

In operation, alert system 100 is either always activated or activated by switch 112, which in turn is activated in the preferred embodiment by switching on a turn signal. After activation, the first sensor 102a and the second sensor 102b sense changes in light through the fresnel lens 120. If these changes meet the design criteria, operational amplifier 104 is activated to generate alarms through alarm circuit 107.

For example, a driver activates switch 112 by turning on his turn signal. The alert system being located in the vehicle at the corners (in the area where the turn signals are typically located) permits first sensor 102a and second sensor 102b to sense objects within a predetermined distance around a blind spot of the vehicle. This activity is used to activate operational amplifier 104 to produce an audible and a visual alarm that can be heard and seen, respectively by a driver of the vehicle, to alert the driver of an object in the blind spot that may not be perceptible to the driver using the mirrors provided on the vehicle.

Whereas the present invention has been described with respect to specific embodiments thereof, it will be understood that various changes and modifications will be suggested to one skilled in the art and it is intended that the invention encompass such changes and modifications as fall within the scope of the appended claim.

What is claimed is:

1. A vehicle alert system that is mounted in a vehicle comprising:
   a first photoresistor connected to a first power supply voltage;
   a second photoresistor connected to the first photoresistor and connected to a second power supply voltage;
   an operational amplifier having a first input, a second input and an output, wherein the first input is connected to a node that connects the first photoresistor to the second photoresistor, the second input is connected to a resistor, and the output is coupled to an alarm circuit element: and
   a fresnel lens mounted adjacent to the first photoresistor and the second photoresistor;
   wherein the resistor has a value of resistance such that selective changes in ambient light detected by the first photoresistor and the second photoresistor cause the operational amplifier to activate the alarm circuit element to generate an alarm.

2. The vehicle alert system of claim 1 wherein the alarm circuit element comprises a light emitting diode.

3. The vehicle alert system of claim 2 wherein the alarm circuit further comprises a buzzer.

4. The vehicle alert system of claim 1 further comprising a switch that supplies one of the first power supply voltage and the second power supply voltage, the switch being activated by activation of a turn signal of the vehicle.

5. The vehicle alert system of claim 1 wherein the resistor is a variable resistor.

* * * * *